(No Model.)
E. BARTHOLOMEW.
VALVED PIPE COUPLING.
No. 481,130. Patented Aug. 16, 1892.
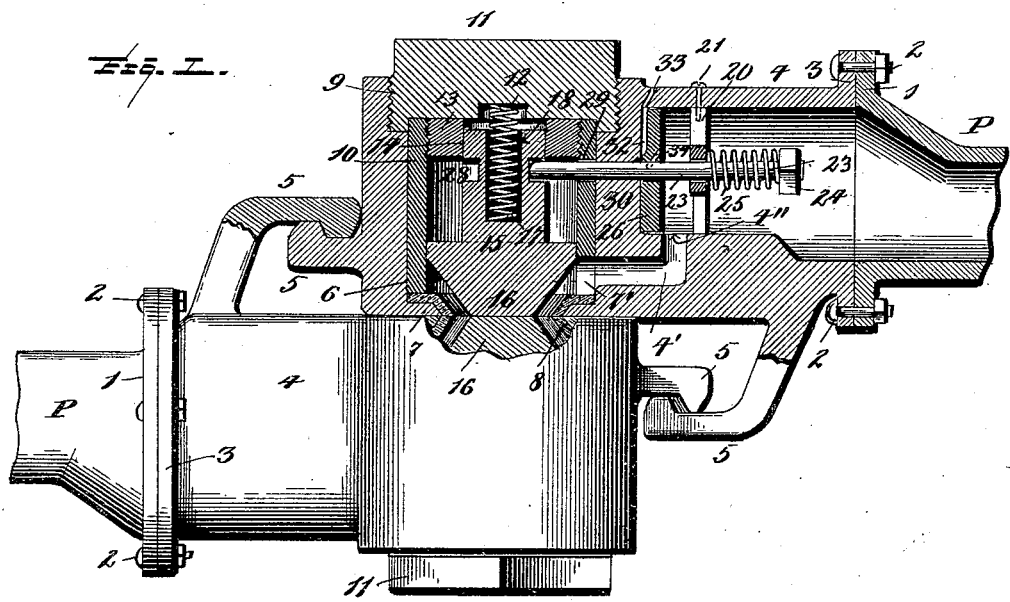
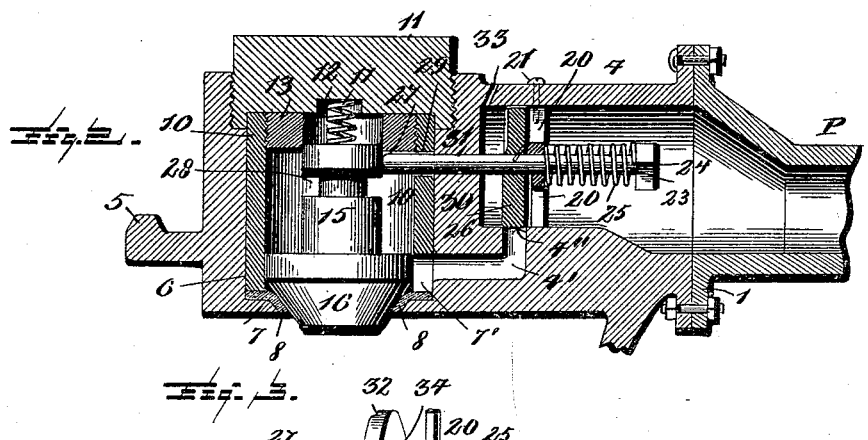
Witnesses:
L. C. Hills.
D. E. Squires.
Inventor:
Ellis Bartholomew,
by Collamer & Co.,
Attorneys.

United States Patent Office.

ELLIS BARTHOLOMEW, OF LIMA, OHIO, ASSIGNOR OF FOUR-FIFTHS TO OSCAR W. BELL, OF SAME PLACE, AND OLIVER JAY AND DANIEL W. JAY, OF ST. MARY'S, OHIO.

VALVED PIPE-COUPLING.

SPECIFICATION forming part of Letters Patent No. 481,130, dated August 16, 1892.

Application filed April 18, 1892. Serial No. 429,614. (No model.)

*To all whom it may concern:*

Be it known that I, ELLIS BARTHOLOMEW, a citizen of the United States, residing at Lima, in the county of Allen and State of Ohio, have invented certain new and useful Improvements in Valved Pipe-Couplings, (Case D;) and I do hereby declare the following to be a full, clear, and exact description of the invention, such as will enable others skilled in the art to which it appertains to make and use the same.

This invention relates to pipe-couplings of that class employing valves which are automatically opened when the two halves of the coupling are connected; and the object of the same is to provide means for locking the valves open, so that when the two couplings are disconnected, as by accident, the pressure in the pipe will first be allowed to escape, and thereby apply the brakes, and afterward the valve will be closed. This object I accomplish by providing the valve-stem with a notch or groove, and also by providing a latch or pin whose tip normally disengages said groove, but is thrown thereinto by the pressure, all as hereinafter more fully described and claimed, and as illustrated on the accompanying sheet of drawings, wherein—

Figure 1 is a central longitudinal section of one half of a coupling and a plan of the second half thereof, showing the two halves as connected. Fig. 2 is a central longitudinal section of one half with its valve closed. Fig. 3 is a perspective detail of the latch and parts connected therewith.

Referring to the said drawings, the letter P designates the train-pipe, which, it will be understood, passes under the car and communicates with the usual mechanism for permitting the application of the brake when the pressure in said pipe is released. At each end of the car this pipe is flanged as at 1, and connected to the flange by bolts 2 is the flange 3 of the casing 4, the latter having the usual arms 5 or other devices for permitting its engagement and connection with the corresponding half-coupling. The outer end of the casing is bored transversely, as at 6, one end of this bore being reduced, as at 7, and preferably covered with the rubber gasket 8 to form a conical valve-seat, while the other end of the bore is enlarged and threaded, as at 9. Within the bore is inserted a cylindrical sleeve 10 whose lower end holds the gasket 8 in place, and against the upper end of this sleeve is screwed a nut 11, preferably having a cavity 12 in its inner face. Within the upper end of the sleeve 10 is preferably secured a collar 13 through whose central aperture 14 may move the stem 15 of the valve, the conical head 16 of this valve being pressed to its seat on the gasket 8 by an expansive spring 17, one end of which rests in the cavity 12 in the nut 11 and the other end of which stands in a socket 18, which is preferably formed in the stem 15, as seen in Fig. 1. One side of the sleeve 7 is perforated, as at 7', and communicates with a passage 4' in the casing which opens, as at 4'', transversely into the interior of the casing.

20 is a spider secured by any preferred means, as a screw 21, within the casing, and through a hole 22 in the center of this spider moves a pin 23, constituting the latch. At the inner end of this pin is a head 24, between which and the spider 20 is an expansive spring 25. To the body of the pin is secured a disk 26, forming a piston-head, and which moves closely in the casing and over the opening 4', and the outer end of this pin is preferably slightly beveled, as at 27, and is of a size to engage a recess or annular groove 28 in the stem 15. In one side of the sleeve 7 is an opening 29, through which the pin 23 passes loosely, and in alignment therewith in the partition 30, which stands between the bore of the casing and its inner end, is another opening 31, wherein the pin fits closely, but may slide. The outer face of the disk 26 is preferably provided with a radial notch 32, adapted to communicate with an exit-port 33, as seen in Fig. 1. The disk is secured to the pin by any desired means, a small pin 34 being shown for this purpose.

With the above construction of parts the operation of my improved pipe-coupling is as follows: The parts being applied in position, as seen in the drawings, the valve stands normally closed, as in Fig. 2; but when the two half-couplings are connected the protruding ends of the heads 16 abut against each other, and these heads are forced back from their seats until the groove 28 in each coupling aligns with the tip of the pin 23. This causes the pressure to flow through the two passages 4', and in such course it presses against the rear face of the disk 26 and forces it, with its pin 23, forward, thereby seating the tip of the pin, in the groove 28 and slightly compressing the spring 25. Thereafter the passage of fluid through the half-couplings will be uninterrupted. When now the half-couplings are disconnected—as, for instance, by the accidental separation of the cars in a train unbeknown to the engineer—this improved coupling will effect the following advantageous results: The pressure in the train-pipe P has a free exit through the passage 4' and passes the valve-head 16, and hence the first result of the separation of the half-couplings will be to decrease the pressure in the train-pipes beneath the cars and apply the brakes thereto. The result is that the disconnected car at the rear end of the train comes to rest on the track, even on a steep downgrade, and will not run into the rear end of the train, and, furthermore, the engineer is immediately aware of the accident that has occurred by the application of the brakes through other agency than his. As soon as the pressure in the pipe P is reduced so that it no longer bears against the rear face of the disk 26 the force of the spring 25 drives said disk, with its pin 23, inwardly and the tip of the pin disengages the groove 28 in the valve-stem, (the bevel 27 assisting,) and then the force of the spring 17 drives the valve-head 16 to its seat. The result of this second movement of parts is that the engineer can then reapply the pressure to take off the brakes—in fact, has full control of the cars which are connected with the locomotive. Obviously he can run his train back and find the detached car without accident. These two actions of parts take place in precisely the same manner when the half-couplings are disconnected purposely and by hand, as will be clear.

I do not limit myself to the precise details of construction, and I have not described the coupling or connecting devices specifically, because they can be varied at will.

The device is of any suitable size, shape, and material.

What is claimed as new is—

1. In a pipe-coupling, the combination, with the casing provided with a bore having a valve-seat, a passage connecting this bore with the train-pipe, a valve in the bore, and a spring holding its head normally against said seat, of a pressure-actuated catch adapted to hold the valve open and a spring normally disconnecting this catch from the valve, as and for the purpose set forth.

2. In a pipe-coupling, the combination, with the casing provided with a transverse bore reduced at one end to form a valve-seat and enlarged at its other end, a rubber gasket on said seat, a sleeve in said bore bearing on the gasket, a nut in said larger end bearing on the sleeve, a valve whose head moves within the sleeve and is adapted to close against said seat and whose stem is reduced, a passage leading from above the seat to the train-pipe, a collar detachably secured within the sleeve and through which collar said stem slides, and a spring between the valve and nut, of a pressure-actuated pin passing through the side of the sleeve under the collar and into the valve-stem and adapted to hold the valve open, and a spring normally disconnecting this catch from the valve, as and for the purpose set forth.

3. In a pipe-coupling, the combination, with the casing provided with a transverse bore having a reduced seat at one end, a sleeve in said bore, a nut holding the sleeve in place, a valve whose head moves within the sleeve and is adapted to close against said seat, the stem of the valve being reduced and socketed, a passage leading from above said seat to the train-pipe, a collar screwed into the sleeve and through which said stem slides, and an expansive spring within said socketed stem bearing against the nut, of a pressure-actuated catch adapted to hold the valve open and a spring normally disconnecting this catch from the valve, as and for the purpose set forth.

4. In a pipe-coupling, the combination, with the casing having a transverse bore provided with a seat at one end and closed at its opposite end and a spring-actuated valve in said bore having a groove in its stem, of a passage leading over above said seat to the longitudinal opening in said casing, a disk closely fitting this opening, a pin secured to said disk and adapted to engage said groove under pressure, and a spring for disengaging the pin and groove, as and for the purpose set forth.

5. In a pipe-coupling, the combination, with the casing having a transverse bore provided with a seat at one end and closed at its opposite end and a spring-actuated valve in said bore having a groove in its stem, of a passage leading from above said seat to the longitudinal opening in said casing, a spider secured in this opening, a pin sliding through the spider and having a head at its inner end, its outer end being adapted to engage said groove, a spring between the spider and head for disengaging said outer end and groove, and a disk secured to the pin, moving over the transverse opening from said passage and adapted by pressure to engage said outer end of the pin with said groove in the stem, as and for the purpose hereinbefore described.

In testimony whereof I affix my signature in presence of two witnesses.

ELLIS BARTHOLOMEW.

Witnesses:
 A. S. GRAHAM,
 J. L. SITZMAN.